Patented Dec. 20, 1949

2,491,526

UNITED STATES PATENT OFFICE 2,491,526

MODIFIED COPOLYMER COMPOSITIONS AND MANUFACTURE AND USE THEREOF

William J. Sparks, Cranford, and David W. Young, Roselle, N. J., assignors to Standard Oil Development Company, a corporation of Delaware No Drawing. Application July 7, 1944, Serial No. 543,972

3 Claims. (Cl. 260—23.5)

This invention relates to normal compositions comprising high molecular weight hydrocarbon copolymers, and to methods of manufacturing and using same, and more particularly it relates to such improvements pertaining to a copolymer of aliphatic olefins such as isobutylene with a polymerizable unsaturated hydrocarbon containing a cyclic nucleus such as styrene.

U. S. Patent 2,274,749 describes copolymers of the general type referred to above, such as copolymers of isobutylene and styrene, and methods of preparing same such as copolymerizing said reactant at a temperature below about 0° C. in the presence of an active halide polymerization catalyst, preferably in the presence of an inert volatile organic liquid serving as a solvent and/or refrigerant. The temperature may, for instance, be —10° C., —50° C., —90° C., —103° C. (the boiling point of liquid ethylene), or even lower. By adjusting the proportions of the two raw materials, and the temperature of copolymerization, copolymers of desired hardness, melting point, plasticity, etc. may be obtained.

Instead of isobutylene, other aliphatic olefins may be used, preferably having more than two carbon atoms and preferably iso-olefins having four to eight carbon atoms, such as isopentene (methyl-2-butene-1) or a normal pentene obtained by dehydration of secondary amyl alcohol.

Instead of styrene, other materials may be used such as alpha methyl styrene, para methyl styrene, indene, terpenes, etc.

The copolymerization is effected by mixing the two reactants, with or without a mutual solvent, if necessary, such as ethylene, propane, butane, methyl chloride, refined naphtha, etc., and then after cooling the reactants to the desired low temperature, adding an active halide catalyst such as boron fluoride, or activated boron fluoride catalyst (e. g., .1% ether added), aluminum chloride, titanium tetrachloride, aluminum alkoxide-aluminum chloride complex (AlCl$_3$.Al[OC$_2$H$_5$]$_3$), AlBr$_3$, AlBr$_3$.Al(OC$_2$H$_5$)$_3$, (AlBr$_3$)$_4$.AlOBr and the like. If desired, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane or propane, at or below the boiling point of the catalyst solvent, and then the catalyst solution cooled down, filtered and added to the reaction mixture. Alternative catalysts include: AlCl$_3$.AlCl$_2$OH, AlBr$_3$.AlBr$_2$OH, AlBr$_2$Cl.AlOCl, AlBrCl$_2$.AlOBr, TiCl$_4$.AlCl$_2$OH, TiOCl$_2$.TiCl$_4$, AlBr$_3$.Br$_2$.CS$_2$, AlBr$_3$.Br$_4$.CS$_2$, BF$_3$-isopropyl alcohol complex, BF$_3$ solution in ethylene, activated BF$_3$ catalyst in ethylene solution, activated BF$_3$ catalyst in methyl chloride solution. Volatile solvents or diluents, e. g. propane, ethane, ethylene, methyl chloride, carbon dioxide (liquid or solid), etc. may also serve as internal or external refrigerants to carry off the liberated heat of polymerization. After completion of the copolymerization, residual catalyst may be hydrolyzed with alcohol, for example, isopropyl alcohol, or water, or both, and removed by washing the product with water and preferably also with dilute aqueous caustic soda.

The resulting solid copolymer may range from a viscous fluid or a relatively stiff plastic mass to a hard, resinous solid, depending upon the temperature of polymerization, the yield of polymer obtained upon the active feed, the type and concentration of catalyst, the proportion of cyclic reactant in the feed, and the temperature at which the physical texture is observed. The proportions in which the styrene and isobutylene have actually combined during copolymerization may be determined by interpolation of a carbon-hydrogen analysis between the limits:

|  | Carbon | Hydrogen |
|---|---|---|
|  | Per cent | Per cent |
| Pure styrene | 92.3 | 7.7 |
| Pure isobutylene | 85.7 | 14.3 |

Generally the molecular weight of the product will range from about 800 or 2,000 upwards, for instance, to 3,000, 5,000, 25,000 or much higher, the larger molecular weights, larger intrinsic viscosity (greater than 0.6) and greater plasticity of polymer product at room temperature being obtained at lower polymerization temperatures, e. g. —75° C. to —103° C. and with lower content of cyclic reactant, e. g. 10% to 40%, or 50%; on the other hand, with relatively higher polymerization temperatures such as —40° C. or —20° C., and with higher proportion of cyclic material, e. g., 50–60% or more, the resulting copolymers are lower in molecular weight and intrinsic viscosity, and have a harder texture.

For convenience and brevity the above-described copolymer of a cyclic polymerizable material and an olefin will be referred to as a cycalkenecopol, or more simply a cycalkene. The specific type of copolymer made from styrene and isobutylene will similarly be referred to for brevity as stybucopol, or more simply stybutene. The invention will be illustrated as applied particularly to stybutene, although it is not to be limited specifically thereto.

Although such high molecular weight resinous and plastic copolymers can be worked mechanically surprisingly well, for instance, by sheeting them out into a self-supporting film, considering that it is difficult to do that satisfactorily with either a plain polyisobutylene of high molecular weight or a plain polystyrene of high molecular weight, yet it has now been found possible very greatly to improve the workability of these high molecular weight copolymers such as the stybutenes.

Broadly, the invention comprises adding to these high molecular weight copolymers an improving agent comprising a metal salt, preferably a high molecular weight metal salt, i. e., a metal salt of a high molecular weight organic acid. Although in some instances a salt of a monovalent metal may be used, it is preferable to use salts of the polyvalent metals, especially the divalent metals such as zinc, calcium, magnesium and the like. Salts of other polyvalent metals such as aluminum may also be used. The organic acids to be used in preparing such metal salts are preferably higher fatty acids of the mono or di-carboxylic acid type such as stearic acid, palmitic acid, oleic acid, or dimerized fat acids such as dilinoleic acid, or lower alkyl esters thereof such as methyl dilinoleate (which esters react readily with the metal hydroxides or oxides in making the corresponding metal salts); one may also use other types of organic acids such as naphthenic acids, preferably those of relatively high molecular weight such as those obtained from petroleum of the kerosene, gas oil or higher boiling range. Specific examples of suitable metal salts are the zinc dilinoleates, which may have a relatively high molecular weight such as 1,000, 10,000, or more, preferably at least 2,000, zinc stearate, aluminum naphthenate, calcium dilinoleate, barium dilinoleate polymer resin and zinc naphthenate.

The amount of such high molecular weight salts to be used will vary chiefly according to the particular copolymers being processed, and according to the intended use of the product, but normally these improved copolymer compositions should contain about 1–50% by weight of the metal salts, although for special purposes lesser or greater amounts may be preferred.

Improved compositions of this invention have a number of unexpected and useful characteristics. For instance, one of the great advantages of the metal salts is its function as a processing aid at about 10° to 140° C. to plasticize the high molecular weight hydrocarbon copolymers, particularly those having a relatively high content of combined cyclic constituents, such as a stybutene containing 40–70%, e. g. 50 or 60% or more of combined styrene. Zinc stearate plasticizes such stybutene with such remarkably good results that it permits sheeting, extrusion, molding, etc. of stybutenes which are normally too hard and tough to permit sheeting on a mill without wrinkling or cracking. These compositions may be extruded or drawn into fine fibers or rods, molding strips for trimming table edges, desk tops, etc. The presence of the metal salt also in most cases tends to reduce surface tack, this being particularly true of the salt such as the high molecular weight zinc dilinoleate.

In carrying out the present invention, various methods may be used in combining the two primary constituents of the compositions of this invention. (One of the simplest methods of obtaining certain advantages of the invention is merely to dust the metal salt on the surface of the copolymer which may have already been formed into some desired shape by hot working, for instance by rolling on a calender into thin sheets, etc.) A stybutene having a combined styrene content of 40 or 60%, and made at a low temperature such as $-103°$ C. and sheeted out into thin films by hot milling, may be dusted on the surface with zinc stearate in order to reduce tackiness of the surface. This film of zinc stearate dust on the surface will not be harmful for later use because if desired the zinc stearate powder may readily be worked into the stybutene by mechanical milling or kneading, especially at slightly elevated temperatures such as about 30° to 310° F. where such surface dusting of zinc stearate or other suitable metal salts, usually about 4 to 25 grams of metal salt should be used per 100 sq. yds. of copolymer sheet material, and this would amount to about 0.8 to 5.5% by weight in the case of a stybutene sheet having a thickness of about 0.001 inch.

The invention primarily contemplates actually incorporating a metal salt such as zinc stearate or zinc dilinoleate intimately and homogeneously into the copolymer such as stybutene. This may be accomplished in several ways, one of which is merely to suspend the zinc stearate powder in the wash water used for washing out residual catalyst from the copolymer, and for such purposes about 0.001 to 0.01 lb. of zinc stearate may be used per gallon of wash water, and in such cases the finished washed copolymer may contain about 0.3 to 3.0% by weight of metal salt.

Another and very suitable method of incorporating the metal salt such as zinc stearate or zinc dilinoleate directly into the stybutene or other copolymer being used is to mill or knead the salt into the copolymer, preferably while hot, for instance, at a temperature of about 85° to 320° F. By this method it appears that at least small amounts of the metal salt actually dissolve in the hydrocarbon copolymer and form a true homogeneous solution which is clear and transparent. For instance, up to 5% or more of zinc stearate can be hot milled into a stybutene of 50% styrene content made at $-103°$ C. and yet the product will form a transparent and practically clear colorless sheet. The same can be done with at least 2% or more of zinc stearate in a stybutene of 60% combined styrene content made at $-103°$ C.

A still further method of incorporating the metal salt into the hydrocarbon copolymer is by the use of volatile solvent, for instance by dissolving either one or both of the solid constituents in a volatile solvent such a naphtha, toluene, etc. and then mixing, followed by evaporation of the solvent either before or after sheeting out into thin films, strips, etc. One advantage of this feature of the invention is that it provides a convenient method of strip coating articles, such as sealing corked bottles by immersing the top thereof in a volatile solvent solution of this copolymer containing 1–10% of zinc stearate and evaporating the solvent; when ready to use the contents of the bottle, the copolymer film coating can be stripped off readily. This same type of solution can be used to coat a smooth solid surface, such as a sheet of glass or a continuous belt of thin polished stainless steel, and then after the solvent evaporates the residual copolymer film can be readily stripped off for use as a self-supporting film. The zinc stearate helps to prevent the film from sticking to the glass or metal surface.

In addition to using the two primary constituents of the compositions of this invention other additives may optionally be used, for instance, dyes, pigments, high molecular weight olefin polymers, wax, micro-crystalline wax, antioxidants, as well as known plasticizers or texture modifying agents.

The invention will be better understood from a consideration of the following examples.

Example 1

A stybutene copolymer having a molecular weight of about 10,000 and having a combined styrene content of about 50% was made at $-103°$ C. with an $AlCl_3$-$CH_3Cl$ catalyst, using two parts of methyl chloride diluent for each one part by volume of olefin feed. This copolymer is a tough resinous plastic and is per se very suitable for many purposes, but it was found that its light surface tack could be completely removed by compounding with it 50 parts by weight of a zinc dilinoleate resin prepared as described above as having a molecular weight of about 10,000, to 100 parts by weight of stybutene copolymer. These are preferably compounded by hot milling or kneading. The addition of the zinc resinate slightly reduced the tensile strength of the copolymer and increased the elongation from 550 to 620%. This blend is free from surface tack and is clear when placed under strain. These are surprising results because such high molecular zinc resinates are not soluble in or compatible with polybutene of 100,000 molecular weight.

Example 2

A stybutene of 40% combined styrene content made at $-103°$ C. was compounded with about 15% to 20% of zinc stearate (about 15 to 20 parts by weight of the latter per 100 parts of the stybutene). The materials were mixed by milling on hot steel rolls such as used for milling rubber, the temperature being about 170° F. After mixing to a homogeneous composition the product was sheeted out very easily into a smooth unwrinkled sheet of about 2 or 3 hundredths of an inch in thickness and having a rather soft leathery feel. Even with the large amount of zinc stearate present, the product was quite translucent and had a slightly bluish tint.

Example 3

Some of the same stybutene used in Example 1 was sheeted out on a mill into a film of about 0.02 in. thick. This sheet was quite translucent in fact almost transparent but was somewhat wrinkled. By adding 2% of zinc stearate and milling until the composition was homogeneous the resultant product was found much more workable and could very easily be sheeted out into a very smooth unwrinkled film which was transparent and almost completely clear.

Example 4

Example 3 was repeated except that 5% of zinc stearate was added to the stybutene, and after hot milling and sheeting out into a film about 0.005 in. thick the sheet was found to be smooth and even, and was just as transparent and clear as the sample of Example 3 in which only 2% of zinc stearate had been added.

This same composition, to which 5% of zinc stearate had been added, was pressed between two flat steel plates at a temperature of about 300° F. and under a pressure of about 80 lbs. per sq. in. for about 15 minutes. The plates were then removed, cooled with cold water and the product was stripped from the metal plates. To act as a stripping aid, the metal plates were treated with a 1% solution of Ivory soap in water before the stybutene was pressed. The resultant product which had a thickness of about 0.02 in. had a soft unctuous leathery feel and a milky white color, and was only very slightly translucent.

This composition as well as that of Example 2 and many of the other examples to be discussed herebelow are very suitable for use as artificial leather either when used alone or after impregnating or coating or laminating with a fibrous material such as cloth, paper, etc., and the resulting product can be used for making various articles normally made heretofore out of leather such as shoes, suitcases, trunks, briefcases, pocketbooks, tobacco pouches, golf bags, etc.

Example 5

A stybutene having a combined styrene content of about 60% was made by the same copolymerization process as was used in preparing the sample of Example 1. The resultant product was sheeted out on a mill to a film of about 0.03 in. in thickness which was tough, colorless, quite translucent, gummy, in fact almost transparent, and was somewhat harder than a similar film of stybutene of 50% styrene content as referred to in Example 3. This product however tended to wrinkle, although this wrinkling becomes less objectionable when the stybutene film is milled further down to thinner films such as 0.01 in. thick or even 0.002 or 0.001 in. thick. With these extremely thin films there is a slight tendency for the copolymer film to stick to the steel roll and there is sometimes a tendency for the thin film to crack.

It is found that dusting the surface of these films, either thick or thin, with zinc stearate reduces or eliminates the surface tack and tendency of the film to stick to the steel roll, and therefore this dusting with the zinc stearate may be applied during the rolling or afterward if preferred. A very satisfactory method is to sheet the copolymer down to a thickness of about 0.01 in. without using any zinc stearate and then dust the surface of the film one or more times during subsequent rolling and sheeting while working the thickness down to a thinner film such as 0.005 or 0.001 in., etc. This dusting of the surface of the copolymer with zinc stearate has the added advantage of preventing the thin copolymer film from becoming tacky during handling due to absorption of a slight amount of oil from the human skin. In other words the zinc stearate tends to make the copolymer surface repellent to fatty oils. In this particular example the stybutene film having a thickness of about 0.01 in. was dusted with an amount of zinc stearate corresponding to about ten grams of zinc stearate per 100 sq. yd. of stybutene film.

Dusting these copolymers with zinc stearate or other high molecular metal salts according to this invention, is much superior to dusting with other finely-divided powders such as zinc oxide, clay, chalk, etc., because these latter inorganic materials are all insoluble in the copolymers, whereas the zinc stearate which is dusted on the surface of the copolymer film can be caused to actually dissolve in the film at any time desired, merely by heating the film to a softening temperature of about 150° F., with or without some mechanical working such as a slight milling between steel rolls.

Example 6

1.5% of zinc stearate was compounded with the same stybutene as used in Example 5 by working it in on the hot mill at a temperature of about 240° F., for about 15 minutes. The composition was then sheeted off a cold calender roll. The zinc stearate prevented the sheet from sticking to the roll and also gave a very thin film about 0.001 inch thick which did not tend to stick to the fingers, thereby indicating that the 1.5% of added zinc stearate tended to prevent the oil of the skin from wetting the surface of the copolymer and dissolving in it. The zinc stearate reduces the friction of rubbing and yet dissolves to make a product which is completely homogeneous and makes a clear transparent film very suitable as a moisture-proof wrapping material, etc. The A. S. T. M. (water vapor permeability of plastic sheets) Method No. D697-42T, issued 1942, indicated the M. V. P. of this film to be 0.118 gram $H_2O$/24 hrs./sq. meter.

*Example 7*

Another sample of stybutene having a combined styrene content of 60% and made by the same process as described in Example 1 was worked on the hot mill while adding about 13% of zinc stearate and then the product was sheeted off into a film about 0.03 in. thick. The product had a smooth leathery feel, a gray color and a slight translucency. It was much softer and more flexible than the unplasticized product. This product could be stretched by pulling with the fingers, whereas the unplasticized copolymer was too tough and insufficiently plastic to permit such stretching of a film having a thickness of as much as 0.02 or more inch. It is also important that the blend containing the zinc stearate could be stretched to the breaking point without blushing, i. e., without showing a whitish discoloration at the point being stretched.

*Example 8*

A series of five tests was made in which much larger amounts of zinc stearate, namely 40, 50, 60, 70 and 80 parts by weight respectively of zinc stearate per 100 parts of stybutene having a 60% content of combined styrene (the same as used in Example 5) were compounded on the hot mill and then sheeted out into film having a thickness of about 0.01 in. These films all have substantially the same degree of translucency, almost transparency, in spite of the increasing proportion of zinc stearate. They all had a slightly gray color with a bluish tint due to the presence of the zinc stearate. They all had a smooth surface and a soft flexible texture, although the one to which 80% of zinc stearate had been added (making about 44% of zinc stearate in the finished composition) had more of a rattle when twisted between the hands or crumpled. These sheets were all free from surface tack and were very suitable for use as water-repellent and moisture-proof wrapping material, either alone or applied to cloth, paper, etc. When each of these sheets is stretched, a whitish blushing appears just before stretching to the breaking point, which indicates that when the polymer molecules are under great strain, just before breaking, the zinc stearate becomes slightly incompatible.

*Example 9*

Another sample of stybutene having a combined styrene content of 60%, similar to that used in Example 5, was compounded by hot milling with 30% of zinc stearate, and then was formed into various shapes such as by extruding into a thin filament having a diameter of about $\frac{1}{32}$ inch, and by drawing into a wire or rod about ⅛ inch in thickness, at a temperature of about 180° F. These compositions containing such a large amount of zinc stearate are sufficiently plastic that they can be drawn or otherwise worked to some extent even at room temperature, whereas without the zinc stearate such a copolymer does not lend itself very satisfactorily to extrusion or drawing except at elevated temperatures.

*Example 10*

Another sample of stybutene having a combined styrene content of about 60% was compounded with zinc stearate by adding about 0.01 lb. of zinc stearate per gallon to the wash water as the copolymer was being washed to remove residual catalyst. Examination after the copolymer was dried by hot milling, indicated that about 2% of zinc stearate had been incorporated in the stybutene. The composition when sheeted out on the mill to a thickness of about 0.01 inch was non-tacky, smooth, colorless, very flexible and transparent, but not as clear as the product described in Example 6.

The invention may also be applied by compounding zinc stearate, zinc dilinoleate or other high molecular weight metal salts to blends of cyc-alkene copolymers with other materials such as natural or synthetic rubber, polystyrene, copolymers of styrene and methyl acrylate, a copolymer of 4% allyl alcohol and 96% methyl acrylate, a copolymer of methyl acrylate p-brom styrene, or other resinous plastics.

It is not intended that the invention be limited to the specific materials which have been given merely for the sake of illustration, but only by the appended claims in which it is intended to claim all novelty inherent in the invention as well as all modifications coming within the scope and spirit of the invention.

We claim:

1. A composition comprising a major proportion of a styrene-isobutylene copolymer having a combined styrene content of about 50 to 60% and having a molecular weight of about 5000 to 25,000, and admixed therewith about 1 to 5% by weight of a zinc salt selected from the group consisting of zinc stearate and zinc dilinoleate.

2. Composition according to claim 1 in which the zinc salt is zinc stearate.

3. Composition according to claim 1 in which the zinc salt is a zinc dilinoleate of at least 2000 molecular weight.

WILLIAM J. SPARKS.
DAVID W. YOUNG.

REFERENCES CITED

The following references are of record in the file of this patent:

UNITED STATES PATENTS

| Number | Name | Date |
|---|---|---|
| 2,056,796 | Macht | Oct. 6, 1936 |
| 2,109,592 | Macht | Mar. 1, 1938 |
| 2,213,423 | Gaylor | Sept. 3, 1940 |
| 2,274,749 | Smyers | Mar. 3, 1942 |
| 2,278,207 | Mathes | Mar. 31, 1942 |
| 2,317,447 | Domizi | Apr. 27, 1943 |
| 2,347,103 | Hayes | Apr. 18, 1944 |

FOREIGN PATENTS

| Number | Country | Date |
|---|---|---|
| 513,521 | Great Britain | Oct. 16, 1939 |